(12) United States Patent
Cai et al.

(10) Patent No.: US 8,408,445 B1
(45) Date of Patent: Apr. 2, 2013

(54) ACTIVELY CONTROLLED VIBRATION WELDING SYSTEM AND METHOD

(75) Inventors: Wayne W. Cai, Troy, MI (US); Bongsu Kang, Fort Wayne, IN (US); Chin-An Tan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/409,494

(22) Filed: Mar. 1, 2012

Related U.S. Application Data

(60) Provisional application No. 61/541,324, filed on Sep. 30, 2011.

(51) Int. Cl.
| | |
|---|---|
| *B23K 1/06* | (2006.01) |
| *B23K 20/12* | (2006.01) |
| *B29C 65/06* | (2006.01) |
| *B29C 65/08* | (2006.01) |

(52) U.S. Cl. ............. 228/102; 228/1.1; 228/2.1; 228/8; 228/110.1; 228/112.1; 156/73.5

(58) Field of Classification Search .................. None
See application file for complete search history.

(56) References Cited

U.S. PATENT DOCUMENTS

| | | | | |
|---|---|---|---|---|
| 3,002,270 | A | * | 10/1961 | De Prisco Carmine Frank .......................... 228/110.1 |
| 3,863,826 | A | * | 2/1975 | Shoh .............................. 228/1.1 |
| 4,040,886 | A | * | 8/1977 | Yen et al. ...................... 156/350 |
| 5,730,832 | A | * | 3/1998 | Sato et al. ..................... 156/499 |
| 5,759,319 | A | * | 6/1998 | Moody et al. ................ 156/73.1 |
| 5,884,831 | A | * | 3/1999 | Sato et al. ..................... 228/6.2 |
| 2004/0041003 | A1 | * | 3/2004 | Higashiyama ............. 228/110.1 |
| 2006/0169746 | A1 | * | 8/2006 | Ozaki et al. .................... 228/101 |
| 2008/0265003 | A1 | * | 10/2008 | Kainuma et al. ........... 228/110.1 |
| 2010/0043943 | A1 | * | 2/2010 | Kimura et al. ............... 156/73.5 |
| 2010/0206487 | A1 | * | 8/2010 | Arai et al. ................... 156/379.6 |
| 2010/0219229 | A1 | * | 9/2010 | Fujita et al. ................ 228/110.1 |
| 2011/0036897 | A1 | * | 2/2011 | Nakai ............................ 228/1.1 |

* cited by examiner

*Primary Examiner* — Kiley Stoner
(74) *Attorney, Agent, or Firm* — Quinn Law Group, PLLC

(57) ABSTRACT

A vibration welding system includes a controller, welding horn, an active material element, and anvil assembly. The assembly may include an anvil body connected to a back plate and support member. The element, e.g., a piezoelectric stack or shape memory alloy, is positioned with respect to the assembly. The horn vibrates in a desirable first direction to form a weld on a work piece. The element controls any vibrations in a second direction by applying calibrated response to the anvil body in the second direction. A method for controlling undesirable vibrations in the system includes positioning the element with respect to the anvil assembly, connecting the anvil body to the support member through the back plate, vibrating the horn in a desirable first direction, and transmitting an input signal to the element to control vibration in an undesirable second direction.

18 Claims, 1 Drawing Sheet

ACTIVELY CONTROLLED VIBRATION WELDING SYSTEM AND METHOD

CROSS-REFERENCE TO RELATED APPLICATIONS

This application claims the benefit of U.S. Provisional Patent Application No. 61/541,324 filed on Sep. 30, 2011, which is hereby incorporated by reference in its entirety.

STATEMENT REGARDING FEDERALLY SPONSORED RESEARCH OR DEVELOPMENT

This invention was made with U.S. Government support under an Agreement/Project DE-EE0002217, Department of Energy Recovery and Reinvestment Act of 2009/Battery Pack Manufacturing B511. The U.S. government may have certain rights in this invention.

TECHNICAL FIELD

The present disclosure relates to an ultrasonic welding system which uses actively controlled damping techniques to improve weld quality.

BACKGROUND

In an ultrasonic welding process, adjacent surfaces of a clamped work piece are joined together by the controlled application of vibration energy to the work piece. Transmission of vibration energy creates surface friction and heat along interfacing surfaces of the work piece. The heat softens the materials of the interfacing surfaces which ultimately bonds the surfaces together, thus forming a welded joint or weld spot.

A typical ultrasonic welding system includes various interconnected welding tools. Primary among these tools are a vibrating sonotrode/welding horn and an anvil assembly. The anvil assembly may include an anvil body and a rigid back plate, the latter of which is bolted to a support member such as a frame, beam, or robot. The work piece is clamped between the horn and the anvil body. The welding horn vibrates at a calibrated frequency in response to an input signal. The anvil body acts as a reaction surface to the vibrating horn.

SUMMARY

An actively controlled vibration welding system includes a vibrating sonotrode/horn and an anvil assembly. The anvil assembly includes an anvil body and a back plate. The anvil body and back plate are attached to a support member. The system also employs an active material element within the anvil assembly, for instance a piezoelectric stack, a shape memory alloy (SMA) device, etc. The active material element is positioned and controlled to substantially damp, attenuate, or otherwise cancel "undesirable" vibrations of the horn, i.e., vibrations in a direction other than the "desirable" direction in which the horn is intended to vibrate in forming welds in a work piece. The anvil body is held as stationary as possible with respect to the vibrating horn using active feed-forward and/or feedback control of the active material element.

It is recognized herein that undesirable vibrations may occur at the welding pads of the horn in the lateral (z) and rotational (θ) directions as explained herein, or in any other direction, in addition to any intended/desired vibrations, e.g., in a longitudinal (x) direction. These undesirable vibrations may degrade the quality of the weld. Typical welding system design approaches fail to properly account for such undesirable vibrations, which may be present due to various factors including imbalanced or imperfect design properties of the horn and the compliance nature of the welding system. For instance, bolts used to fasten the back plate and anvil body to the support structure may add flexibility to the various connections between the anvil body, back plate, and support structure, and thus can contribute to undesirable vibrations. The present system is therefore directed toward ameliorating the effects of these undesirable vibrations via active control of the active material element on the anvil side of the assembly.

In particular, the present ultrasonic welding system includes a welding controller, a welding horn, and an anvil assembly having an anvil body and a back plate connected to a support member. The system also includes an active material element positioned with respect to the anvil assembly, for instance between the anvil body and the back plate. The active material element may be a piezoelectric stack or a shape memory alloy (SMA) device in example non-limiting embodiments. Another piezoelectric stack may be present on the input side of the horn. This additional stack may be configured to cause the horn to vibrate at a calibrated frequency in response to an input signal from the controller. The active material element is also in communication with the controller, or with a separate controller in an alternative embodiment. A single controller will be described hereinafter for illustrative simplicity.

The controller, which may be an integral part of a welding power supply or a separate device, is configured for generating a first input signal commanding the calibrated frequency, and for transmitting the first input signal to a converter, e.g., a piezoelectric stack, for vibrating the horn. While most of the vibrations of the horn are in a desired direction, for instance the vertical x direction as explained below, some undesirable vibrations will occur in other directions such as the lateral z, rotational θ, and depth Y directions. The present controller is therefore provided with knowledge of these undesirable vibrations, either as a calibration value determined off line or via real-time sensing and feedback in two possible embodiments.

In the first embodiment, the controller uses feed-forward control by transmitting a second input signal to the active material element of the anvil body. The second input signal may cause a predetermined phase shift or other response to occur in vibrations at the anvil body with respect to the undesired vibrations, thus substantially damping, attenuating, or cancelling the undesirable vibrations.

In the second embodiment, a sensor may be positioned with respect to the anvil assembly, such as near the anvil pads, and used to measure and thus quantify the characteristics of the undesirable vibrations. The sensor may be optionally configured as a dual-use transducer capable of both measuring the vibrations and imparting an output signal to the controller. Various multi-functional materials exist that are capable of performing such a dual-use function, and thus acting as an active feedback sensor in a closed feedback loop. A "smart"/active material such as a piezoelectric actuator or piezo-sensor is one such possibility. Other possibilities are described below.

A method includes positioning an active material element with respect to a welding anvil assembly, connecting the anvil assembly to a support member, and transmitting a first input signal from a controller to a converter to thereby vibrate a welding horn in a first direction, and to thereby form a weld on a work piece. The method also includes transmitting a second input signal from the controller to the active material element, and then generating a calibrated output within the anvil assembly via the active material element in response to the second input signal to actively control vibration of the anvil assembly in a second direction.

The above and other features and advantages of the present invention are readily apparent from the following detailed description of the best modes for carrying out the invention when taken in connection with the accompanying drawings.

DESCRIPTION

Figure 1:
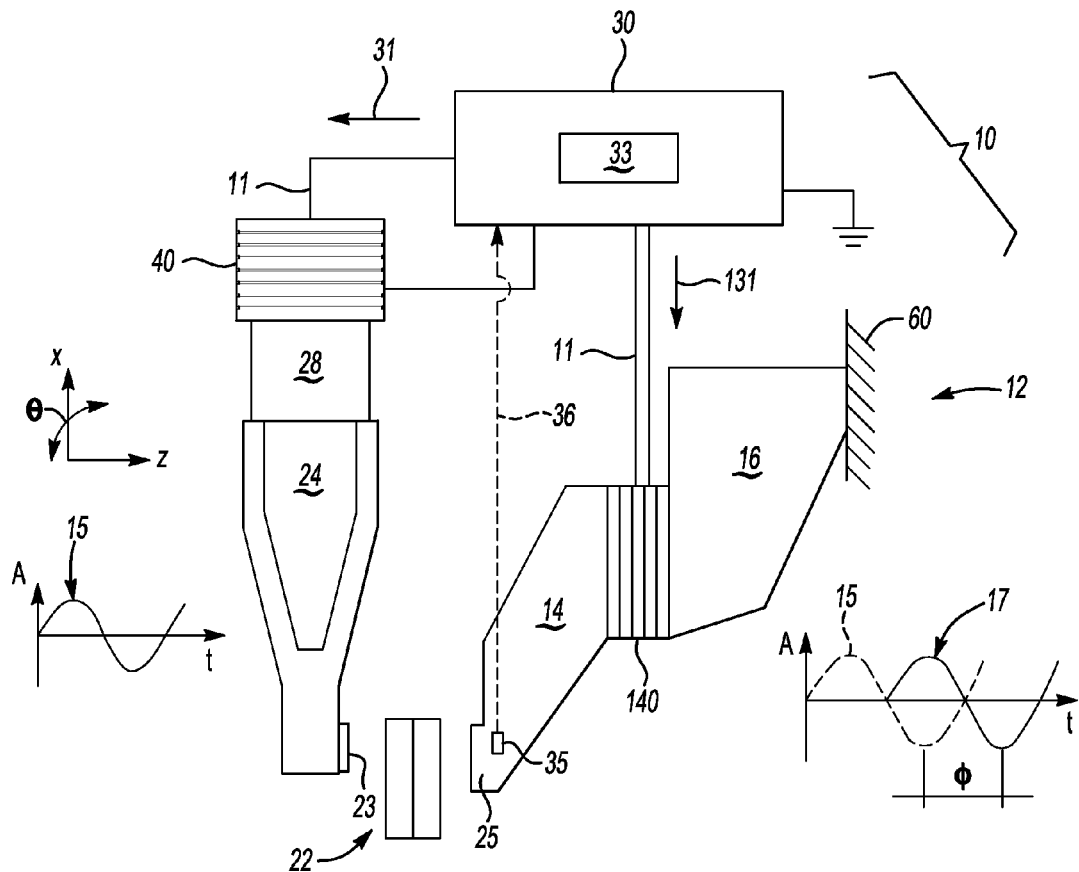
FIG. 1 is a schematic illustration of an example ultrasonic welding system having an anvil body with an active material element that is actively controlled in a manner that substantially cancels undesired anvil vibrations within the system.

Referring to the drawings, wherein like reference numbers refer to like components, an ultrasonic welding system 10 is shown in FIG. 1 that includes a vibrating sonotrode/welding horn 24 and an anvil assembly 12. The system 10 is configured for forming vibration-welded joints using ultrasonic vibration energy, a process that is well understood in the art. While referred to hereinafter by the term "ultrasonic" for illustrative consistency, those of ordinary skill in the art will appreciate that other vibration frequency ranges may also be used without departing from the intended inventive scope. The use of a broader scope of available frequency ranges may be referred generally to as vibration welding.

As will be described below, the system 10 of FIG. 1 is configured to actively control an active material element 140 to thereby control, i.e., substantially damp, attenuate, or cancel, any "undesirable" vibrations, i.e., vibrations occurring in any direction other than that of the intended or "desirable" direction of vibrations applied to form a weld via welding anvil assembly 12 during the ultrasonic welding process. This is achieved via placement and control of the active material element 140 such as a piezoelectric stack, a shape memory alloy (SMA) device, or another smart material actuator with respect to the anvil assembly 12. The horn 24 may be caused to vibrate by a piezoelectric stack 40 or other vibrational energy input device.

As is understood in the art, piezoelectric materials are electromechanical materials which convert energy between mechanical and electric domains. Piezoelectric materials are traditionally crystalline structures or ceramics which produce an output voltage signal in response to a mechanical stress. This effect also occurs in the reverse manner, i.e., a voltage input applied to a sample piezoelectric material produces a mechanical displacement or strain. For example, activation of a given piezoelectric material can result in a change in dimension of approximately 0.1% for piezo-ceramics and approximately 1% for piezo-polymers.

The active material element 140, if constructed as a piezoelectric stack, can therefore be constructed of multiple layers of, e.g., thin piezo-ceramic or piezo-polymeric, with each layer connected in electrical parallel with respect to the other layers. The active material element 140 can be caused to vibrate when an input signal is applied, such as the input signal (arrow 131) shown in FIG. 1.

SMAs by contrast are thermo-mechanical materials which convert energy between mechanical and thermal domains. Examples of piezoelectric materials include piezo-ceramics, lead zirconate titanate (PZT), polyvinylidene fluoride (PVDF), etc. SMA examples include nitinol, copper-zinc-aluminium-nickel, copper-aluminium-nickel, iron-manganese-silicon, and nickel-titanium alloys. Applications of SMAs for vibration control as the active material element 140 could utilize the heat dissipation occurring during the welding process, e.g., real-time thermal energy harvesting, or may be activated by a direct application of heating as the second input signal (arrow 131). SMA material properties can also change in response to application of electromagnetic fields, and therefore the second input signal (arrow 131) may include an applied field.

Undesirable vibrations may propagate within the system 10 to the locus of the weld during formation of a welded joint/weld spot with respect to a given work piece 22. This may occur by virtue of the compliance, geometry, and materials of the system 10, including the stiffness properties of the connections between an anvil body 14, a back plate 16, and a support member 60 of the anvil assembly 12. The support member 60 may be a metal framework, beam, robot, or other support structure.

The direction of any desirable vibrations may vary depending on the configuration of the system 10. For instance, if lateral (z direction) welding is used to form a weld, vibration in the lateral z direction may be considered as desirable vibration, and vibration in the longitudinal x direction, rotating θ direction, and/or other directions may be considered as undesirable vibration, e.g., a depth or y direction from the perspective of FIG. 1. For illustrative consistency, the longitudinal/vertical x direction will be treated hereinafter as the desirable vibration direction, although the scope is not limited to this direction. Additionally, while the x direction is shown schematically in FIG. 1 as being upwardly oriented in that Figure, the positive x direction may be downward in other embodiments without departing from the intended inventive scope.

Regardless of the designated desirable direction, undesirable vibrations in any other direction may affect the quality of the welds formed in an example work piece 22. Therefore, the present system 10 is designed in such a way as to actively control the level of undesirable vibrations occurring in the anvil assembly 12, specifically using either a feed-forward control approach or a closed-loop feedback control approach with respect to the active material element 140.

The anvil assembly 12 of FIG. 1 includes the anvil body 14 and the back plate 16. As a whole, the anvil assembly 12 provides a relatively static mass of metal sufficient for opposing the horn 24 during execution of the vibration welding process. The horn 24 may include welding pads 23 facing the work piece 22 that is to be welded. The welding pads 23 may include knurl patterns such as raised bumps or ridges. The welding pads 23 are the structure of the horn 24 that actually come into direct contact with the work piece 22 during the welding process. The anvil body 14 may likewise have similar anvil pads 25. The pads 23 and 25 together facilitate the secure gripping of a work piece 22.

To properly drive and control the ultrasonic welding process, a welding power supply 30 may be used to transform available source power into a form usable with vibration welding. The power supply 30 may therefore include any required voltage rectifiers, converters, and inverters needed for producing a high-frequency electrical signal. A power supply of the type typically used in a vibration welding process, such as the example power supply 30 of FIG. 1, can be electrically-connected to any suitable energy source, e.g., a 50-60 Hz wall socket. The power supply 30 may include one or more welding controllers 33 as part of the power supply as shown or as a separate device. The controller(s) 33 and power supply 30 are in electrical communication with the horn 24 and, as noted below, the anvil assembly 12 over a set of electrical conductors 11.

The power supply 30 and the welding controller 33 ultimately transform source power into a suitable power control signal having a predetermined waveform characteristic(s) suited for use in the vibration welding process, for example a frequency of several Hertz (Hz) to approximately 40 kHz, or much higher frequencies depending on the particular application. Additional welding equipment may include a booster 28. The piezoelectric stack 40 produces a desired mechanical vibration, e.g., in the x direction, in response to a first input signal (arrow 31) that is transmitted over conductors 11. The booster 28 amplifies the vibration of the first input signal (arrow 31) to the extent needed.

Still referring to FIG. 1, the active material element 140 is positioned with respect to, i.e., somewhere on or within the structure of, the anvil assembly 12. In one embodiment, this location may be between the anvil body 14 and the back plate 16, although the active material element 140 may be positioned elsewhere, for instance between the back plate 16 and the support member 60. The active material element 140 is placed in electrical communication with the power supply 30 and controller 33 via one set of the conductors 11.

A second input signal (arrow 131) is transmitted by the power supply 30 and/or the controller 33 over conductors 11 to activate the active material element 140. The second input signal (arrow 131) may be configured to generate desired forces, e.g., in the form of displacements/strains, which may be manifested as vibration in the anvil body 14 through activation of the active material element 140. For example, the displacement or strain response generated by the active material element 140 may be substantially amplitude- and phase-coordinated with respect to the amplitude and phase of any undesirable vibrations of the horn 24 as represented by the example output waveform 17. Or, the active material element 140 may provide a non-linear dither response providing a relatively high-frequency excitation to the anvil body 14, i.e., a dither signal. As is understood in the art, the response of a system subjected to frequency control is determined by the waveform characteristics of the dither signal that is introduced.

An example output waveform 15 is shown with respect to time (t) in FIG. 1, with the waveform having an amplitude (A). This periodic waveform represents one possible undesirable waveform in an undesirable direction. While shown as a typical periodic signal, this waveform 15 is not so limited. The example output waveform 17 is shown with respect to the anvil assembly 12, which may represent an output waveform as caused by input of the signal (arrow) 131 to the active material element 140. As shown, waveform 17 with amplitude (A) is periodic and substantially amplitude-coordinated and frequency-coordinated with respect to waveform 15, but is phase shifted by $\phi$ degrees with respect to the waveform 15 so as to substantially cancel the waveform 15. In other embodiments the output waveform may be a dither waveform having a non-periodic signal, a signal that is alternatively increasing and decreasing in amplitude, an intermittent signal, spike, etc.

In one embodiment, the undesirable vibrations of the horn 24 at the pads 23 may be determined offline as a calibration value and recorded in memory of the controller 33. If the system 10 is used to weld different work pieces 22, different vibration characteristics may result, and thus different calibration values may be recorded to account for each of the different vibration characteristics. Once recorded, the controller 33 may use a feed-forward control approach to substantially dampen or attenuate the undesired vibrations. That is, given knowledge of the excitation such as frequency/wavelength and amplitude, a substantially complete cancellation of the excitation may be achieved by feeding forward the required response via the active material element 140.

In another embodiment, classical feedback control may be applied by the controller using a vibration sensor 35. The sensor 35 may be positioned with respect to the anvil body 14 to measure and transmit a feedback signal (arrow 36) to the controller 33. Thus, in real time the controller 33 can modify or adapt the second input signal (arrow 131) as needed to cause the active material element 140 to vibrate with the required cancelling response.

The sensor 35 may be constructed of multi-functional materials. As is known in the art, such materials may include certain metals and other materials, e.g., amorphous alloys with complex structures, or bulk metallic glasses developed from amorphous alloys, multi-component inter-metallic compounds, quasi-crystals, oxides, ceramics, nano-structural controlled metals, semiconductors, crystals for solar cells, biomaterials, organic materials, hydrogen storage alloys, and shaped crystals, etc. The sensor 35 may be alternatively configured as a piezoelectric sensor or other "smart material" sensor which acts as a dual-use transducer capable of both measuring the vibrations and imparting an output signal to the controller. Therefore, in another embodiment the sensor 35 and active material element 140 may be the same device, i.e., acting as both a sensor and an actuator.

Figure 2:
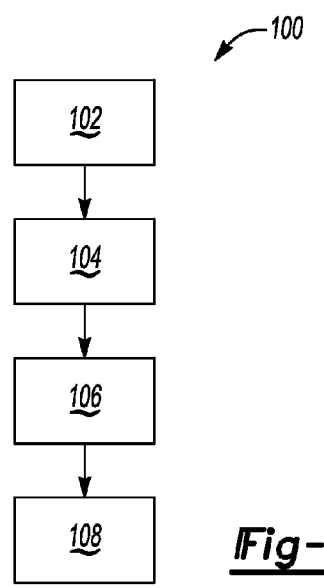
FIG. 2 is a flow chart describing a method for actively controlling undesirable anvil vibrations using an active material element for anvil damping in the system shown in FIG. 1.

Referring to FIG. 2, an example method 100 is shown for actively controlling the vibration of a welding anvil assembly, e.g., the example assembly 12 of FIG. 1 to thereby optimize weld quality of a vibration-welded work piece such as the example work piece 22 of the same Figure.

Beginning with step 102, a welding horn 24 is provided. Step 102 may entail positioning piezoelectric stack 40 of FIG. 1 with respect to the horn 24 and the booster 28 in electrical communication with the controller 33, e.g., via a set of the electrical conductors 11 as shown.

At step 104, active material element 140 is positioned with respect to the anvil assembly 12 of FIG. 1. For instance, the active material element 140 may be positioned between the anvil body 14 and the back plate 16 as shown, or between the back plate 16 and support member 60, or in close proximity to the pads 25. Step 104 may entail bolting the anvil body 14 and back plate 16 to the support member 60 to trap or sandwich the active material element 140 within the anvil assembly 12.

At step 106, the first input signal (arrow 31) is applied. This value is calibrated to cause the horn 24 to vibrate at a calibrated frequency sufficient for joining the surfaces of the work piece, e.g., the example work piece 22 of FIG. 1. Step 106 may entail selecting the required amplitude and frequency of the first input signal (arrow 31) from memory and transmitting the first input signal (arrow 31) to the first piezoelectric stack 40 to cause the piezoelectric stack 40 to vibrate the horn 24.

At step 108, the controller 33 applies the second input signal (arrow 131) to the active material element 140 to produce a desired damping response at the anvil body 14. For instance, the input signal (arrow 131) may cause the anvil body 14 to vibrate in a phase-shifted and substantially amplitude- and frequency-coordinated manner with respect to the undesired vibration response occurring at the horn 24, specifically in proximity to the pads 23. For example, a periodic vibration represented by waveform 15 may be experienced in either or both of the z and θ directions, with step 108 entailing application of the example waveform 17 with a 180° phase shift to substantially cancel the waveform 15 at the locus of the weld. The actual phase shift will vary depending on the periodicity or other waveform characteristics of the measured undesirable vibrations. Alternatively, step 108 may entail generating a dither signal to provide control over the response, as known in the art and explained above. As a result, the anvil body 14 and/or the horn 24 will not vibrate the work piece 22 with undesirable vibrations noted above. The resultant weld spots on the work piece 22 are optimized in this manner.

While the best modes for carrying out the invention have been described in detail, those familiar with the art to which this invention relates will recognize various alternative designs and embodiments for practicing the invention within the scope of the appended claims.

The invention claimed is:

1. A vibration welding system comprising:
   a controller that selectively generates a first input signal and a second input signal;
   a welding horn in electrical communication with the controller, wherein the horn is configured to vibrate in a first direction in response to the first input signal to thereby form a weld with respect to a work piece;
   an anvil assembly mounted to a support member; and
   an active material element positioned with respect to the anvil assembly, wherein the active material element is configured to apply a calibrated output to the anvil assembly in response to the second input signal to thereby actively control vibration of the horn in a second direction that is different from the first direction.

2. The system of claim 1, wherein the anvil assembly includes an anvil body and a back plate.

3. The system of claim 2, wherein the active material element is one of a piezoelectric stack and a shape memory alloy.

4. The system of claim 3, wherein the active material element is positioned between the anvil body and the back plate.

5. The system of claim 1, wherein the active material element is a piezoelectric stack constructed of multiple piezo-polymer sheets.

6. The system of claim 1, wherein the calibrated output is one of a sinusoidal displacement and a sinusoidal strain.

7. The system of claim 1, further comprising a sensor positioned with respect to the anvil assembly in electrical communication with the controller, wherein:
   the sensor is configured to measure a vibration of the anvil assembly in the second direction; and
   the controller is configured to adapt the second input signal as a function of the measured vibration.

8. The system of claim 1, wherein the second input signal is a non-linear dither signal.

9. A method comprising:
   positioning an active material element with respect to a welding anvil assembly;
   connecting the anvil assembly to a support member;
   transmitting a first input signal from a controller to a converter to thereby vibrate a welding horn in a first direction, and to thereby form a weld on a work piece;
   transmitting a second input signal from the controller to the active material element; and
   generating a calibrated output within the anvil assembly via the active material element in response to the second input signal to actively control vibration of the anvil assembly in a second direction that is different from the first direction.

10. The method of claim 9, wherein the anvil assembly includes an anvil body and a back plate, and wherein positioning the active material element with respect to the welding anvil assembly includes positioning the active material element between the anvil body and the back plate.

11. The method of claim 9, wherein the active material element is one of a piezoelectric stack and a shape memory alloy.

12. The method of claim 9, wherein generating a calibrated output includes generating one of a sinusoidal displacement and a sinusoidal strain.

13. The method of claim 9, further comprising:
   positioning a sensor positioned with respect to the anvil assembly in electrical communication with the controller;
   measuring a vibration of the anvil assembly in the second direction via the sensor; and
   using the controller to adapt the second input signal as a function of the measured vibration.

14. The method of claim 9, wherein transmitting a second input signal from the controller to the active material element includes generating a non-linear dither signal.

15. A vibration welding system comprising:
   a controller that selectively generates a first input signal and a second input signal;
   a welding horn in electrical communication with the controller, wherein the horn is configured to vibrate in a first direction in response to the first input signal to thereby form a weld with respect to a work piece;
   an anvil assembly having an anvil body and a back plate, wherein the anvil body and the back plate are mounted to each other and to a support member;
   a sensor positioned with respect to the anvil assembly in electrical communication with the controller, and configured to measure a vibration of the anvil assembly in a second direction; and
   a piezoelectric stack positioned between the anvil body and the back plate, wherein:
   the controller is configured to generate the second input signal as a function of the measured vibration; and
   the piezoelectric stack is configured to apply a calibrated displacement or strain to the anvil assembly in response to the second input signal to thereby actively control vibration of the horn in a second direction that is different from the first direction.

16. The system of claim 15, wherein the piezoelectric stack is constructed of multiple piezo-polymer sheets.

17. The system of claim 15, wherein the second input signal is sinusoidal.

18. The system of claim 15, wherein the second input signal is a non-linear dither signal.

\* \* \* \* \*